(12) United States Patent
Nieminen et al.

(10) Patent No.: US 7,433,338 B2
(45) Date of Patent: Oct. 7, 2008

(54) METHOD FOR SUPPORTING MOBILITY IN WIRELESS NETWORKS

(76) Inventors: Marko Nieminen, Köydenpunojankatu 8 E 116, FIN-00180 Helsinki (FI); Jaska Tyni, Hiidenkiukaantie 2 A 1, FIN-00340 Helsinki (FI)

( * ) Notice: Subject to any disclaimer, the term of this patent is extended or adjusted under 35 U.S.C. 154(b) by 931 days.

(21) Appl. No.: 10/453,728

(22) Filed: Jun. 3, 2003

(65) Prior Publication Data
US 2004/0005884 A1 Jan. 8, 2004

(30) Foreign Application Priority Data
Jan. 11, 2002 (FI) .................................... 20020061
Nov. 28, 2002 (WO) ....................... PCT/FI02/00958

(51) Int. Cl.
*H04Q 7/00* (2006.01)
*H04Q 7/20* (2006.01)
*H04L 12/28* (2006.01)

(52) U.S. Cl. ................... 370/331; 370/351; 370/401; 370/429; 455/432.1; 455/433; 455/436; 455/445

(58) Field of Classification Search .................. 370/331, 370/351, 401, 429; 455/432.1, 433, 436, 455/445
See application file for complete search history.

(56) References Cited

U.S. PATENT DOCUMENTS 6,130,892 A * 10/2000 Short et al. .................. 370/401
6,407,988 B1 * 6/2002 Agraharam et al. ......... 370/328
6,484,211 B2 * 11/2002 Turunen ..................... 709/245
6,496,505 B2 * 12/2002 La Porta et al. ............. 370/392
6,539,225 B1 * 3/2003 Lee ............................ 455/436
6,842,456 B1 * 1/2005 Chen et al. .................. 370/401
6,999,437 B2 * 2/2006 Krishnamurthi et al. .... 370/331
7,136,362 B2 * 11/2006 Chen .......................... 370/328
7,139,833 B2 * 11/2006 Heller ........................ 709/238
2001/0044305 A1 11/2001 Reddy et al.
2002/0021680 A1 * 2/2002 Chen .......................... 370/331
2002/0191576 A1 * 12/2002 Inoue et al. ................. 370/338
2003/0018810 A1 * 1/2003 Karagiannis et al. ........ 709/238
2003/0093553 A1 * 5/2003 Le et al. ..................... 709/238

FOREIGN PATENT DOCUMENTS

EP  924914 A3  8/1999
EP  1011241 A1  6/2000

OTHER PUBLICATIONS

Subir Das et al., "IDMP: An Intradomain Mobility Management Protocol For Next-Generation Wireless Networks", IEEE Wireless Communications (Jun. 2002).

* cited by examiner

*Primary Examiner*—Duc M Nguyen

(57) ABSTRACT

A method enables mobility in a wireless network consuming less resources than prior art methods. The wireless network contains mobile devices, base stations, and a network server connected to the Internet. The method uses IP headers within the wireless networks, in place of Mobile IP headers. A base station changes mobile device's home address to a care-of address when the mobile device sends a packet to the network server. Correspondingly, the base station changes the care-of address to the mobile device's home address when the network server sends a packet to the mobile device.

12 Claims, 7 Drawing Sheets

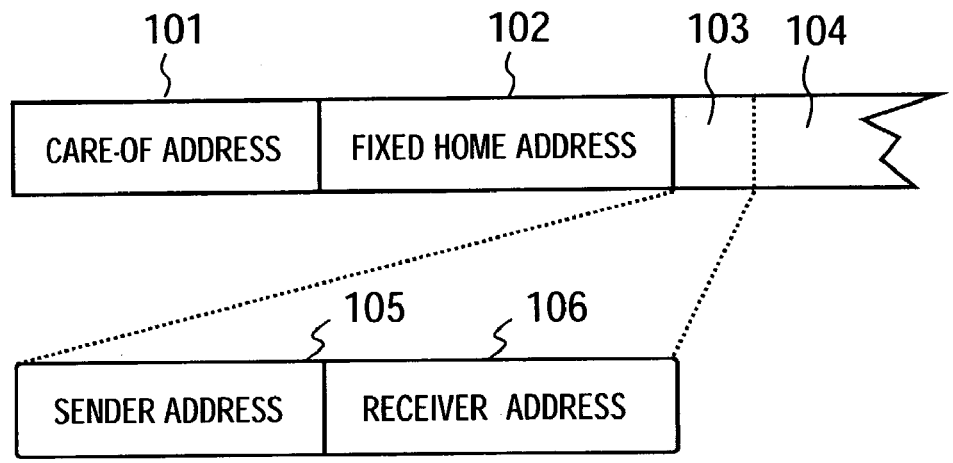
PRIOR ART  FIG. 1
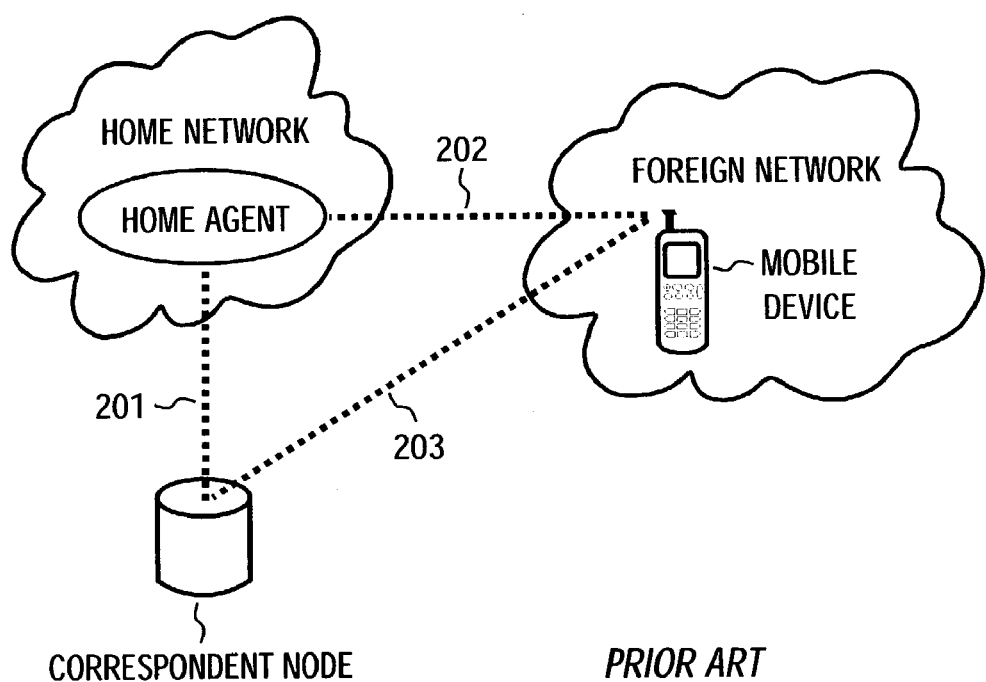
PRIOR ART
FIG. 2

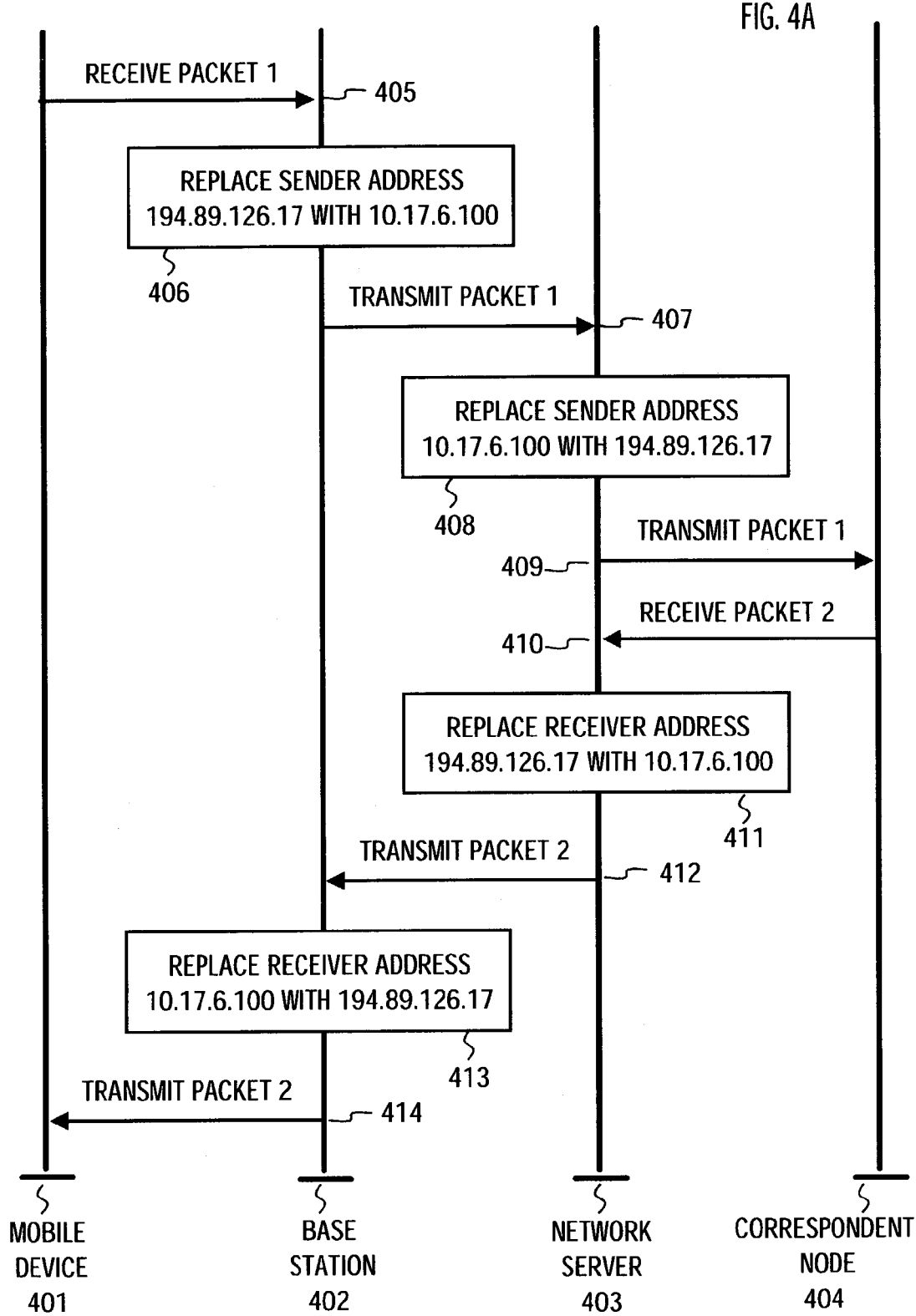

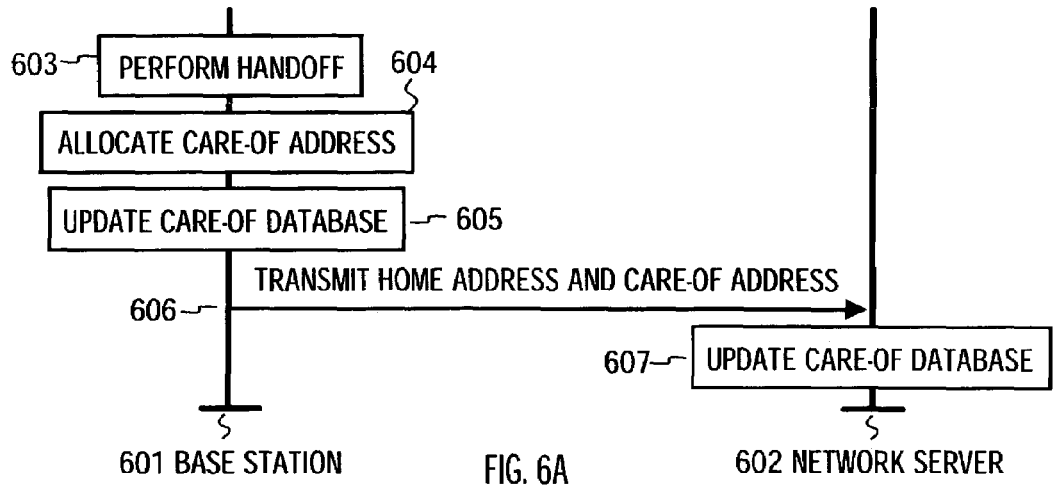
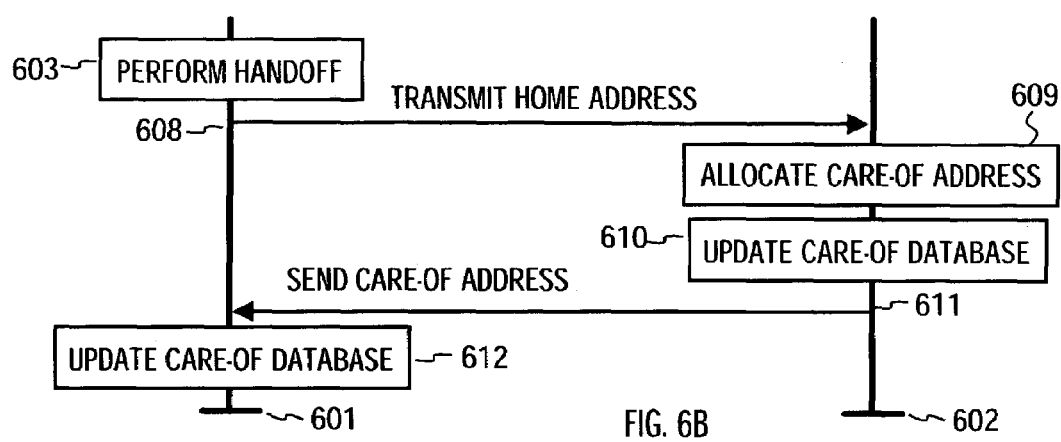
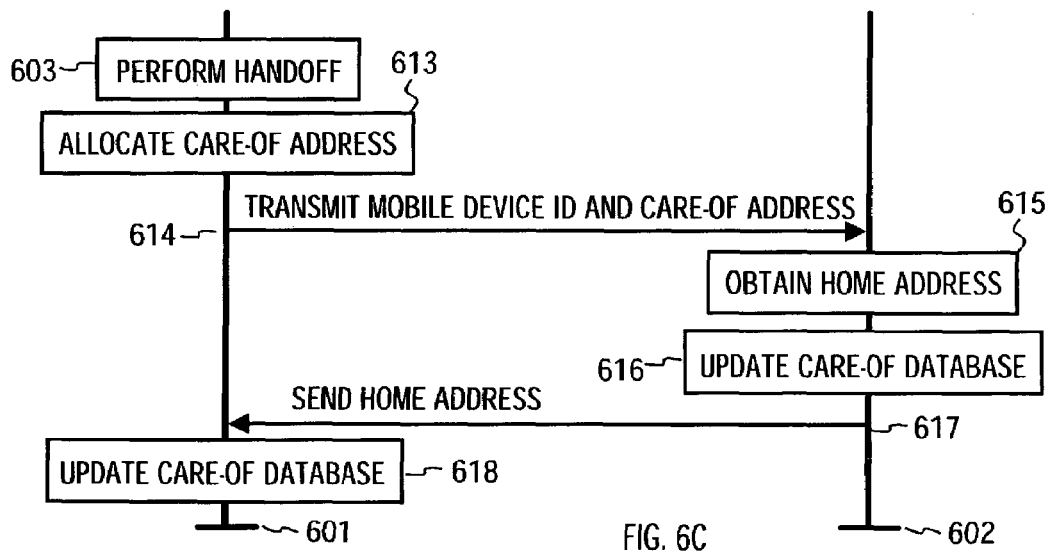

| 801 | MOBILE DEVICE LIST |||
|---|---|---|---|
| | HOME ADDRESS | CARE-OF ADDRESS | VISITOR ADDRESS |
| 803 | 194.89.126.17 | 201.90.44.13 | 0 |
| 804 | 201.12.133.2 | 12.41.88.104 | 194.55.87.4 |
| | ... | ... | ... |

| 802 | MOBILE DEVICE LIST |||
|---|---|---|---|
| | HOME ADDRESS | CARE-OF ADDRESS | VISITOR ADDRESS |
| 805 | 194.89.126.17 | 33.1.88.65 | 201.90.44.13 |
| 806 | 201.12.133.2 | 194.55.87.4 | 0 |
| | ... | ... | ... |

METHOD FOR SUPPORTING MOBILITY IN WIRELESS NETWORKS

RELATED APPLICATIONS

This application claims the benefit of priority under 35 U.S.C. §120 to PCT application PCT/FI02/00958, filed Nov. 28, 2002 which in turn claims priority to Finnish Patent Application No. 20020061 filed on Jan. 11, 2002.

FIELD OF THE INVENTION

The present invention generally relates to wireless networks and Internet protocol (IP) communications.

BACKGROUND OF THE INVENTION

A WLAN (Wireless Local Area Network) is an alternative for a fixed network. The users of a WLAN can move within the network area and use the network services. When users are outside of their home WLAN, they need special arrangements for using network services. "Mobile IP" is a protocol supporting wireless access over the Internet. Mobile IP is outlined in an Internet Engineering Task Force (IETF) proposal entitled "IP Mobility Support (RFC 2002, 1996), C. E. Perkins—Editor. The use of Mobile IP requires that each mobile device is identified by a fixed home address and associated with a home agent. The home agent always knows the location of the mobile device. When a mobile device and a correspondent node communicate via the Internet, packets sent from the correspondent node to the mobile device are directed to the home agent. The correspondent node is any service or any communication device outside of the mobile device's home network.

If the mobile device is away from its home network, the home agent forwards packets within a so-called IP-in-IP tunnel to an assigned care-of address registered with the mobile device.

FIG. 1 shows a packet with a Mobile IP header. The Mobile IP header includes two Internet peripheral (IP) addresses: a care-of address 101 and a fixed home address 102. The care-of address 101 discloses the current location of a mobile device. The fixed home address 102 can be used for identifying the mobile device, because each mobile device has a unique fixed home address. The payload of the packet 103 contains an IP header 104. The IP header includes two IP address fields: a sender address 105 and a receiver address 106.

FIG. 2 depicts the operation of Mobile IP. It uses a so-called two-legged routing scheme for routing packets. In the first leg a packet is routed from a correspondent node to the home agent of a mobile device 201. In the second leg the packet is routed from the home agent to the mobile device 202. The mobile device sends its own packet direct to the IP address of the correspondent node 203. Of course, it is possible that the mobile device communicates with another mobile device. In that case, the home agent of the other mobile device routes the packet from the correspondent node to the current IP address of the other mobile device (not shown).

Mobile IP provides a reasonably effective framework for macro-mobility, i.e. it allows mobile device users to roam away from a home network without disrupting mobile device applications. However, Mobile IP does not effectively support micro-mobility, i.e. handoffs of a mobile device. Each base station covers a limited geographic area. Each base station has its own IP address and a set of care-of addresses. A base station attaches one of its care-of addresses to a mobile device when the mobile device moves into the base station's area. A handoff is needed every time the mobile device moves between the geographic areas of two base stations. A handoff changes the mobile device's care-of address. The handoff also forces the mobile device to notify the home agent of its new care-of address. Therefore the use of Mobile IP results in a lot of signalling between the mobile device and the home agent.

The prior art methods which support micro-mobility in wireless networks, such as WLANs, suffer from several drawbacks.

The first drawback is that mobile device handoffs consume a great deal of time and resources within the mobile device's current network.

The second drawback is that the handoffs consume the resources of the Internet, because the care-of addresses must be transmitted to the home agents.

The third drawback is that an additional header, such as a Mobile IP header, increases the need of processing and transmission capacity.

The fourth drawback relates to a fact that only a few mobile devices and network elements so far have Mobile IP capability, and they are high-priced. Therefore it is profitable to utilize well-tested and low-priced TCP/IP mobile devices and network elements.

SUMMARY OF THE INVENTION

The main objective of the invention is to effectively support micro-mobility in wireless networks. The inventive method uses solely IP headers, thus each packet to be transmitted includes one IP address for identifying a sender and another IP address for identifying a receiver.

As mentioned above, each mobile device has an IP address which identifies the mobile device. A base station transmits packets between the mobile device's home address and the network server's address. For example, the mobile device's home address could be 194.89.126.17 and the network server's address could be 194.89.126.4. Each base station has a set of care-of addresses. The set may include, for example, IP address 10.17.6.100.

A mobile device communicates with the correspondent node via a base station and via a network server. The base station replaces the mobile device's home address, i.e. the sender address of the packet, with one of its care-of addresses. For example, the base station could replace IP address 194.89.126.17 with 10.17.6.100. Then the base station transmits the packet to the network server that replaces IP address 10.17.6.100 with 194.89.126.17 and transmits the packet to the correspondent node. In response to the transmitted packet, the network server receives a response packet from the correspondent node. The response packet includes IP address 194.89.126.17 placed in the receiver address of the packet. The network server replaces IP address 194.89.126.17 with 10.17.6.100 and transmits it to the base station. The base station replaces the care-of address with the mobile device's address, i.e. 10.17.6.100 is replaced with 194.89.126.17. After that the base station transmits the packet to the mobile device.

To summarize: the IP address changes made by a base station and network server result in that a mobile device can move in the area of its home network during a communication. The communication continues in spite of possible handoffs.

Another objective of the invention is to support mobile devices' mobility between wireless networks. The objectives of the invention are achieved in the patent claims.

The inventive method can be utilized when implementing a network system composed of a network server and at least one base station. The network server could also be termed a network controller or a handover control unit (HOCU), but it is termed "network server" for shortness and generality.

The inventive method can be considered as a communications protocol for wireless networks containing base stations and a network server.

Communication between a mobile device and a base station may be IP-based, but it also may be, for example, Bluetooth-based. Communication between the base station and a network server is IP-based when the communication concerns the IP-packets to be transmitted. In addition, the base station and the network server communicate to transmit a mapping between the mobile device's home address and its care-of address. The said communication may or may not be IP-based.

BRIEF DESCRIPTION OF THE DRAWINGS

The invention is described more closely with reference to the accompanying drawings, in which FIG. 1 shows a header used in Mobile IP, FIG. 2 depicts the operation of Mobile IP, FIG. 4 shows use examples of the method, FIG. 6 shows four embodiments of updating a care-of database.

DETAILED DESCRIPTION OF THE INVENTION

The method uses solely IP headers, thus there is less data to be processed and transmitted compared to Mobile IP communications. In addition, only few mobile devices and network elements have Mobile IP capability and they are high-priced, thus it is technically and economically profitable to choose the method that operates with or without Mobile IP.

Figure 3:
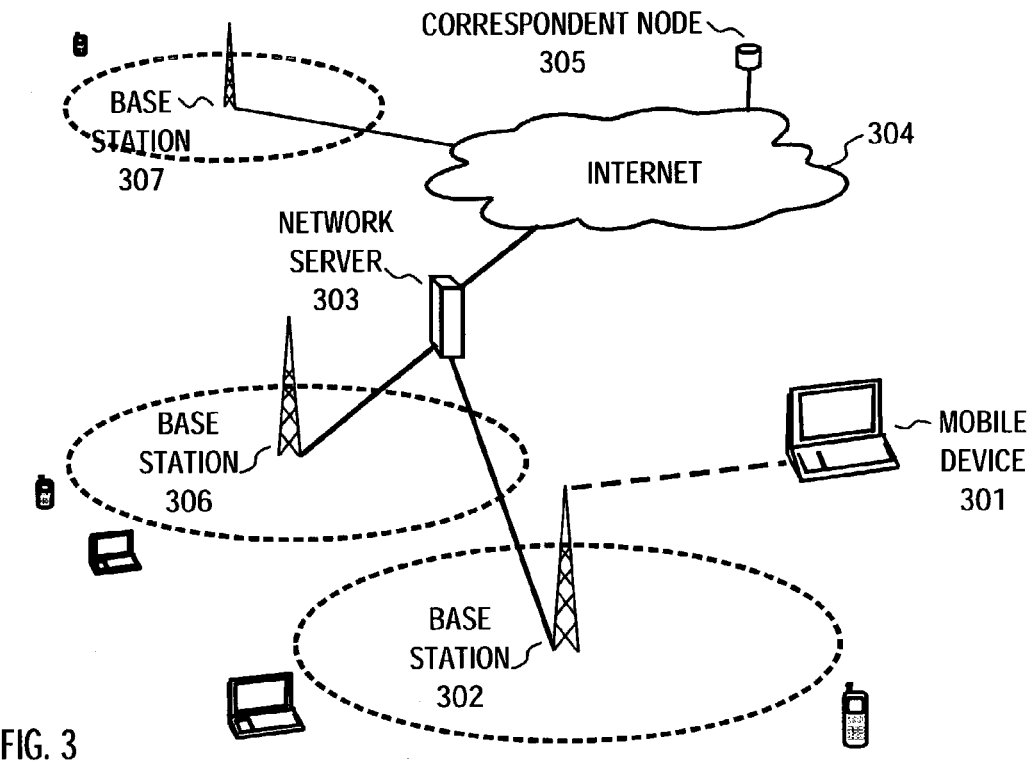
FIG. 3 shows an example of a wireless network.

FIG. 3 shows an example of a wireless network in which the method can be utilized. The wireless network contains a network server, base stations, and mobile devices. The network server can also be termed a domain router because Internet traffic passes through it. When a mobile device 301 sends a packet to a correspondent node, the packet is transmitted via a base station 302, via the network server 303, and via the Internet 304 to the correspondent node 305. The base station 302 and base stations 306 and 307 compose a home network of the mobile device 301. Each base station 302, 306, and 307 has its own transmission area in which the base station serves mobile devices. In this example one of the base stations, i.e. base station 307, communicates with the network server via the Internet.

The transmission areas of base stations are termed sub-networks. Thus, in FIG. 3, the home network of the mobile device 301 is composed of three sub-networks.

FIG. 4A shows a first use example of the method. The example concerns a mobile device 401, a base station 402, a network server 403, and a correspondent node 404. In the first use example the mobile device 401 is located in the sub-network area of the base station 402 all the time when the mobile device 401 communicates with the correspondent node 404. The mobile device 401 has IP-address 194.89.189.17, which is its home address, and the base station 402 has care-of address 10.17.6.100, which is one of its free care-of addresses. The mobile device sends packet 1 to the correspondent node via the base station and via the network server as follows. The base station receives 405 packet 1 and replaces 406 the sender address of packet 1 with, for example, care-of address 10.17.6.100. Thus, the sender address 194.89.126.17 is replaced 406 by 10.17.6.100. The base station transmits 407 packet 1 to the network server, which replaces 408, the sender address of packet 1 with the mobile device's home address, i.e. 10.17.6.100 is replaced with 194.89.126.17. Then the network server transmits 409 packet 1 to the correspondent node 404, which receives packet 1 and sends 410 packet 2 to the network server as response to packet 1. The network server replaces 411 the receiver address of packet 2 with the care-of address, i.e. 194.89.126.17 is replaced with 10.17.6.100. The network server transmits 412 packet 2 to the base station, which replaces 413 care-of address 10.17.6.100 with 194.89.126.17 and transmits the packet to the mobile device.

Figures 4B, 5:
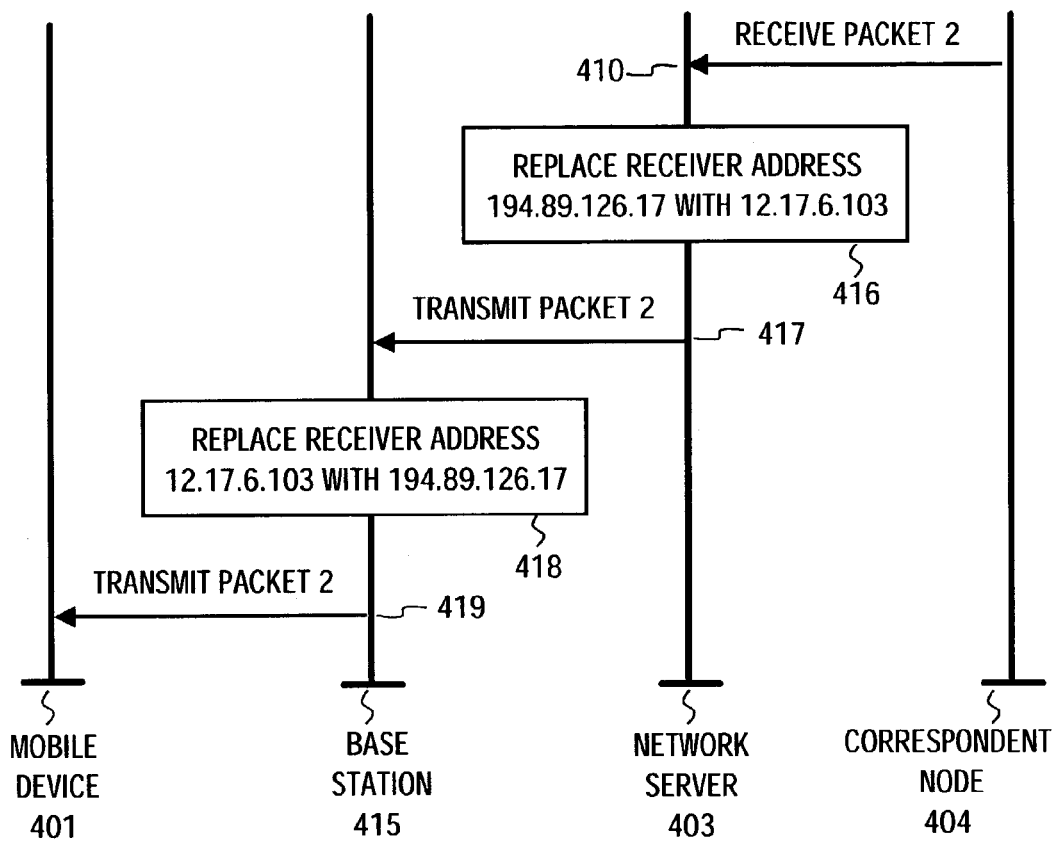
FIG. 5 shows an example of a mobile device list.

FIG. 4B shows a second use example of the method. The second use example concerns the same mobile device 401, network server 403, and correspondent node 404 as the first use example, but this time the mobile device 401 moves out of the area of the base station 402 during the time when the mobile device 401 communicates with the correspondent node 404. We may suppose, for example, that the mobile device is located in a moving train and therefore the mobile device is moved from the sub-network area of the base station 402 to the sub-network area of another base station 415 during the time period between phases 408 and 411. Then the other base station 415 starts to serve the mobile device 401. Phases 405-409 are the same as in the first use example, thus phases 405-409 are omitted from FIG. 4B. Also phase 410 is the same as in the first use example, but phase 410 is included in FIG. 4B to point out that the correspondent node does not need information about the location of the mobile device 401. The correspondent node sends packet 2 to the network server. The network server receives 410 packet 2 and replaces 416 the receiver address of packet 2 with a current care-of address of the mobile device 401. The current care-of address could be, for example, 12.17.6.103 belonging to the base station 415. Thus, the receiver address 194.89.126.17 is replaced with 12.17.6.103. The network server transmits 417 packet 2 to the base station 415. The base station 415 replaces 418 the receiver address with the mobile device's home address, i.e. 12.17.6.103 is replaced with 194.89.126.17.

As described above in phases 411 and 416, a network server places the mobile device's current care-of address to the receiver address of a packet that a correspondent node has sent to the said mobile device. Thus, mobile device's care-of address may change during a communication. Because the care-of addresses of numerous mobile devices may change during their communications, a network server at least needs data structures to manage mobile devices' IP addresses and care-of addresses.

FIG. 5 shows an example of a mobile device list. The said list is composed of records, which include at least two fields: one field for the mobile device's home address and another field for the mobile device's current care-of address. The first field is termed "home address" and the latter field is termed "care-of address". Of course, a record could include more than these two fields. In record 501 in the home address field the value 194.89.126.17 is stored and in the care-of address field the value 10.17.6.100 is stored. In record 502 in the home address field the value 194.89.126.21 is stored and in the care-of address field the value 12.17.6.103 is stored. Thus, the records of the mobile device list are mappings between the mobile devices' home addresses and the mobile devices' current care-of addresses. In addition, a second list could be composed of records that are mappings between the mobile devices' home addresses and the mobile devices' identifiers. For example, medium access control number (MAC number) can be used as a mobile device's identifier (ID). The second list could include all mobile devices belonging to a certain network. Instead, the mobile device list shown in FIG. 5 could include only those mobile devices that are switched on and/or logged into the certain network.

The mobile device list and the second list can be used as follows. When the home address of a mobile device is known, the home address can be used as a search key, i.e. the home address identifies a certain record of the mobile device list. Correspondingly, when the mobile device ID is known, the mobile device ID can be used as a search key because it identifies a certain record in the second list. The said record includes the home address, which can be used as a search key when finding a corresponding record in the mobile device list.

The base stations of a network may also have mobile device lists, but each base station has its own list including only those mobile devices that are located in the transmission area of the base station. Then each base station has its own IP address space from which it allocates a free care-of address to a mobile device.

We may consider that a care-of database includes at least one mobile device list. In addition, we may consider that the care-of database is up to date so that a network server and a base station obtain a mapping between the home address and the care-of address of a mobile device from the care-of database when the network server and the base station replaces IP-addresses as described in FIG. 4. The care-of database can be implemented differently by using various data structures and database models.

FIG. 6 shows four embodiments of updating a care-of database. In each embodiment a base station 601 and a network server 602 communicate with each other, and the base station performs a handoff 603 for the mobile device. The handoff is performed because the mobile device has moved from the area of a second base station to the area of the base station 601.

In the first embodiment (FIG. 6A) the base station 601 allocates a free care-of address 604 from its care-of address set. Of course, the care-of addresses, which are already included in the base station's mobile device list, are not free and cannot be allocated. Then the base station updates the care-of database 605. In more detail, the base station creates a new record having the mobile device's home address and the care-of address and adds 605 the said record to its mobile device list. Finally, the base station transmits the mobile device's home address and care-of address 606 to the network server 602. The network server updates the care-of database 607. In more detail, the network server updates its own mobile device list and, in addition, the network server informs the second base station in which area the mobile device was previously located, when the second base station can remove a record related to the said mobile device from its mobile device list.

In the second embodiment (FIG. 6B) the base station 601 transmits 608 the home address of a mobile device to the network server 602. The network server allocates 609 a care-of address to the mobile device and updates 610 the care-of database. Also in this (second) embodiment, as well as in the third and fourth embodiment, the network server informs a second base station in which area the mobile device was previously located, when the second base station removes a record related to the said mobile device from its mobile device list. Finally, the network server sends 611 the care-of address to the base station that updates 612 the care-of database.

In the following embodiments the base station 601 does not obtain or does not accept the mobile device's home address when performing the handoff 603. Instead, the base station obtains the mobile device's ID, such as a MAC number. Then the base station transmits the mobile device's ID to the network server and as response to the ID transmitted, the network server transmits the mobile device's home address to the base station. In one case, the network server uses an ID as a search key to obtain the corresponding home address. In more detail, the network server uses a list composed of mappings between the mobile devices' home addresses and the mobile devices' identifiers to find the corresponding home address. In another case, the network server allocates a home address from a set of home addresses. However, to keep the patent application text simple, we have used the phrase "a network server obtains a home address" throughout the patent application.

In the third embodiment (FIG. 6C) The base station allocates 613 a care-of address and transmits 614 the mobile device ID and the care-of address to the network server 602. The network server obtains 615 the home address of the mobile device and updates 616 the care-of database. In more detail, the network server uses the mobile device ID as a search key and places the care-of address in a record identified by the search key. Then the network server sends 617 the home address to the base station that updates 618 the care-of database.

In the fourth embodiment (FIG. 6D) the base station 601 transmits 619 the mobile device ID to the network server 602. The network server obtains 620 the home address of the mobile device, allocates 621 a care-of address to the mobile device, and updates 622 the care-of database. Then the network server sends 623 the home address and the care-of address to the base station that updates 624 the care-of database.

In all the above-described embodiments the base station 601 and the network server may handle several mobile devices at once. This reduces the transmission need between the network server and the base station. Therefore, in FIG. 6, the network server could send fifty home address and care-of address pairs to the base station.

When a mobile device logins a network the operation is the same as in a handoff. Therefore the above-described embodiments also concern the login of a mobile device.

The method further enables that a mobile device can move from its home network to a foreign network, if the foreign network supports the method. The method can be considered as a protocol for wireless networks. The protocol, which is termed MageIP, is an alternative to MobileIP.

Figure 7:
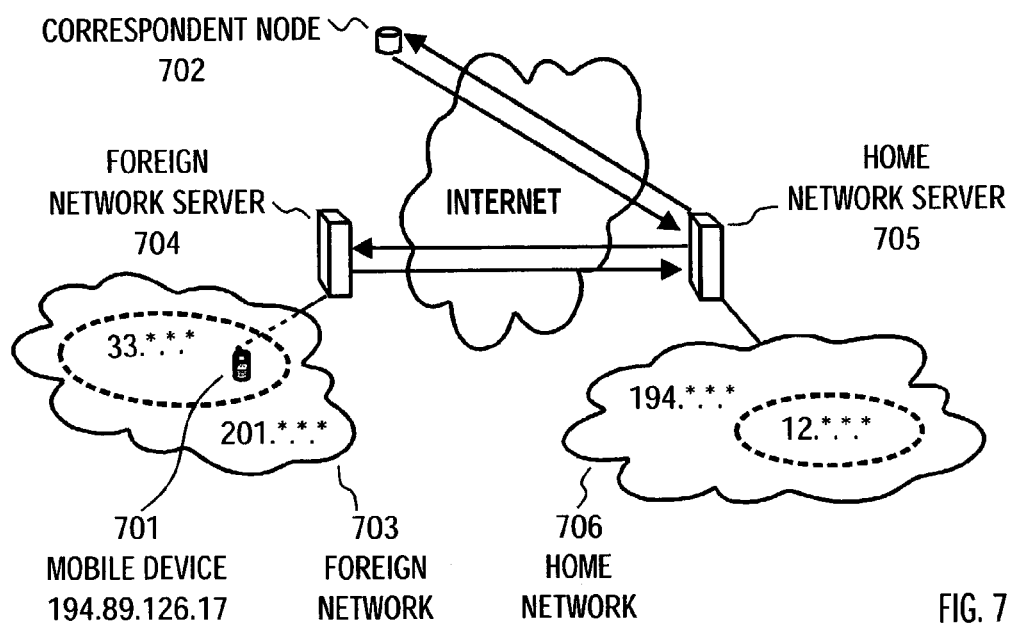
FIG. 7 depicts communication when a mobile device locates in a foreign network.

FIG. 7 depicts communication when a mobile device locates in a foreign network that supports MageIP. The mobile device 701 having home address 194.89.126.17 communicates with a correspondent node 702. The mobile device is located in a sub-network area belonging to the foreign network 703. The sub-network's care-of addresses are in this example form 33.*.*.*. A foreign network server 704 uses and updates the foreign network's care-of database. In addition, the foreign network server communicates with the mobile device's home network server 705 in order that the home network server can update a care-of database. The foreign network and home network 706 have their own care-of databases. From the point of view of the home network server 705, the foreign network server is similar to a base station belonging to a home network 706. When the foreign network server and the home network server have finished the login of the mobile device 701, the mobile device can communicate with the correspondent node 702, so that packets are transmitted, in both ways, via a base station belonging to the foreign network, via the foreign network server 704, and via the home network server 705. Some IP-tunneling can be used when transmitting the packets between the foreign network server and the home network server.

When a mobile device logs into a foreign network, the owner of the mobile device should declare the home network server's IP address to the foreign network server so that the foreign network server can communicate with the home network server. Alternatively, the foreign network server may obtain the home network server's IP address from a certain service.

A new field termed "visitor address" can be added to the network server's mobile device list to support visiting. Visiting means that a mobile device is currently located in a foreign network.

Figures 6D, 8:
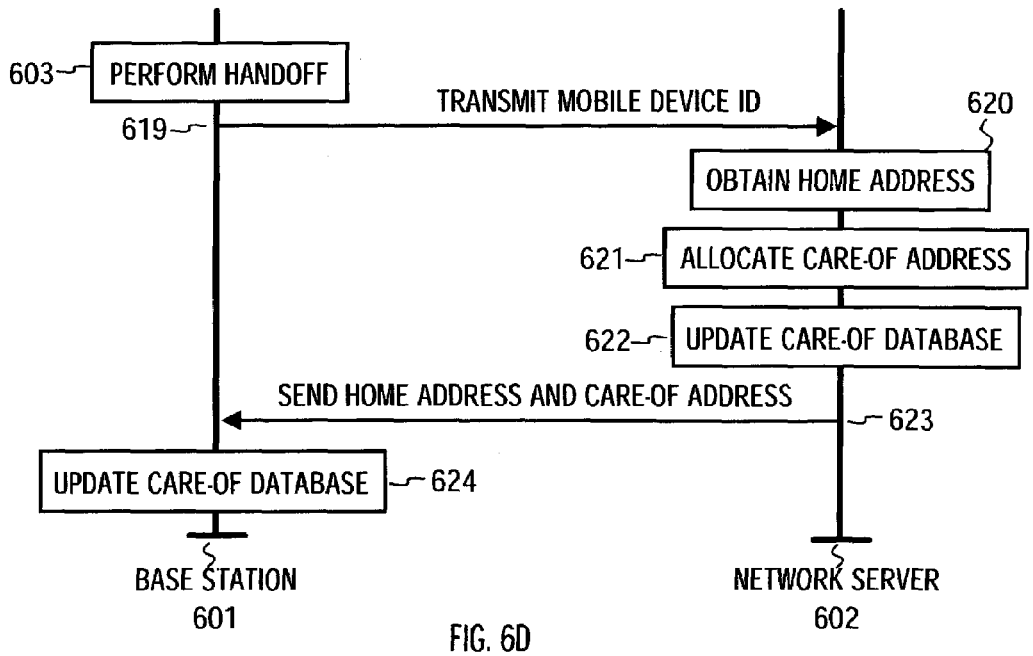
FIG. 8 shows two mobile device lists with a visitor address field.

FIG. 8 shows two mobile device lists in which records include the visitor address field. When the visitor address field includes the value 0, it means the record relates to the network's own mobile device. When the visitor address field includes another value than 0, it means the record relates to a foreign mobile device. We may suppose that the home network server shown in FIG. 7 uses a mobile device list 801 and the foreign network server shown in FIG. 7 uses a mobile device list 802. The upper mobile device list 801 includes records 803 and 804. The home network server can determine that home network's IP-addresses are form 194 . * . * . * and it can also determine all the forms of the home network's care-of addresses. Thus, the record 803 indicates that a mobile device having home address 194.89.126.17 is located in a foreign network because the mobile device's care-of address starts with "201". The said IP address is termed "visitor address". Correspondingly, the record 804 indicates that a mobile device having home address 201.12.133.2 is from a certain foreign network because the said IP address starts with "201". The lower mobile device list 802 includes records 805 and 806. The record 805 indicates that the mobile device having home address 194.89.126.17 is located in a sub-network area whose care-of addresses are in the form 33.* . * . * . The visitor address field of the record 805 includes visitor address 201.90.44.13 allocated by the foreign network server. The same IP-address, 201.90.44.13, is written in the record 803 belonging to the mobile device list updated by the home network server, but the IP-address is placed in the care-of field of the record. The visiting is possible in both ways. For example, a record 806 indicates that a mobile device having ID 201.12.133.2 is on visit in the network of which IP-addresses are in the form 194.* . * . * .

When a mobile device is visiting in a foreign network, the mobile devices' home network server has the mobile device's visitor address, but not its care-of address. Only the foreign network server has the mobile device's care-of address indicating the mobile device's current sub-network area. When the mobile device moves in the foreign network from a sub-network area to another sub-network area, the base station of the other sub-network area performs a handoff. After the handoff, the said base station and the foreign network server updates the foreign network's care-of database. The four embodiments shown in FIGS. 6A, 6B, 6C, and 6D also concern the updating of the foreign network's care-of database.

Figure 9A:
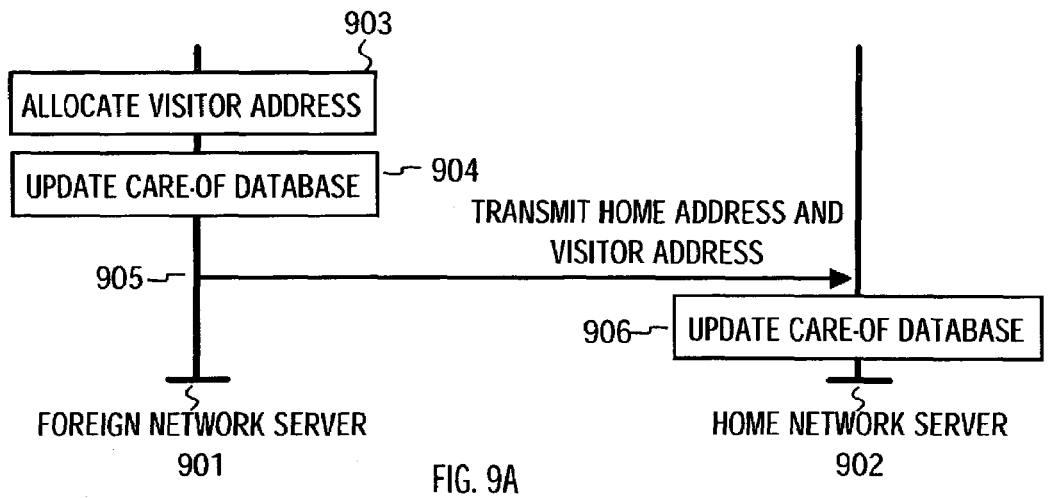
FIG. 9 shows two embodiments of updating care-of databases when a mobile device logs into a foreign network.
Figure 9B:
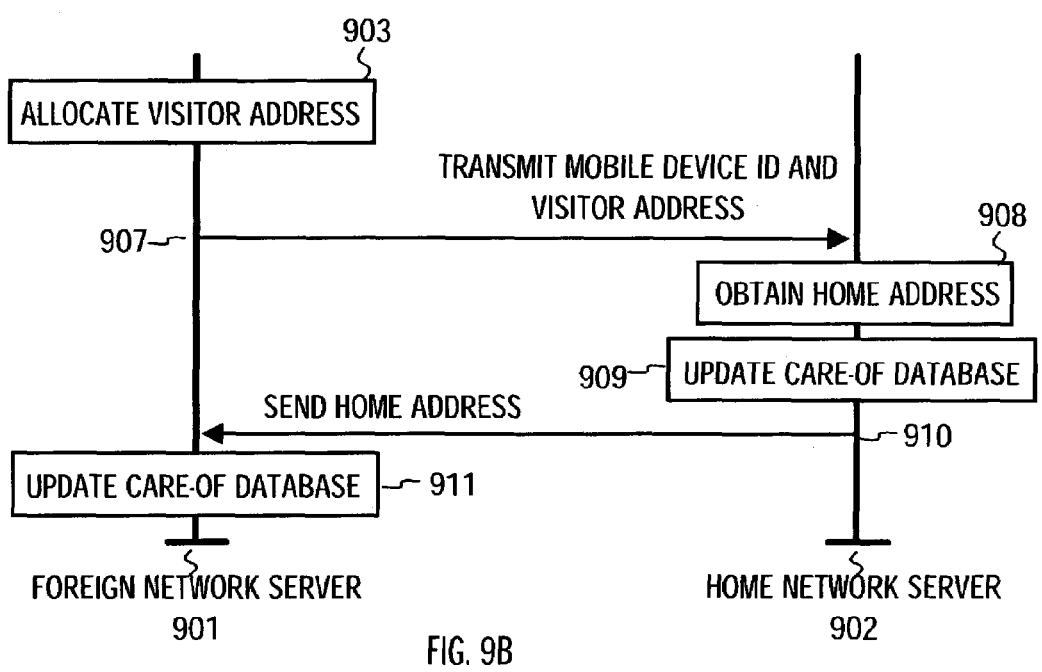

FIG. 9 shows two embodiments for updating care-of databases when a mobile device logs into a foreign network. In both embodiments a foreign network server 901 and a home network server 902 communicate with each other in order to update the care-of databases.

In the first embodiment (FIG. 9A) it is supposed that the foreign network server 901 obtains the mobile device's home address when the mobile device logs into the foreign network. Then the foreign network server allocates 903 a visitor address to the mobile device and updates 904 the care-of database. In more detail, the foreign network server places the visitor address in the visitor address field of a certain record belonging to a mobile device list. The record 805 in FIG. 8 is an example of the said record. Finally, the foreign network server transmits the mobile device's home address and visitor address to the home network server 902. The home network server updates the home network's care-of database. In more detail, the home network server places the visitor address transmitted in the care-of field of a certain record of a mobile device list. The record 803 in FIG. 8 is an example of the said record.

In the second embodiment (FIG. 9B) it is supposed that the foreign network server 901 does not obtain the mobile device's home address when the mobile device logs into the foreign network. Instead, it obtains the mobile device's ID, such as a MAC number. The foreign network server allocates 903 a visitor address to the mobile device, and transmits 907 the mobile device's ID and visitor address to the home network server 902. The home network server obtains 908 a home address of the mobile device. Then the home network server updates 909 the home network's care-of database as in the first embodiment. Finally, the home network server sends 910 the mobile device's home address to the foreign network server that updates 911 the care-of database as in the first embodiment.

In the both above-described embodiments the network servers may handle several mobile devices at once, for example, fifty mobile devices at once. This reduces the transmission need between the network servers.

As shown in FIG. 7, communication packets can be transmitted, in both ways, via the base station belonging to the foreign network, via the foreign network server 704, and via the home network server 705. However, it is possible to support the mobility of a mobile device which either don't have a home network or which don't have a reason to use a home address belonging its home network. We would like to point out that a home address does not have to be a fixed IP address, which is intended to a certain mobile device. We would also like to point out that a home address does not have to be intended only to the mobile devices of a home network. For example, we may suppose that the mobile device 701 have no reason to use a home address belonging to its home network 706. Then the mobile device 701 obtains a home address from the foreign network server 704 in order to communicate with the correspondent node 702.

As described above, the method can be considered as a protocol for wireless networks. Wireless networks may be e.g. WLANs or mobile networks. Of course, a network must support the protocol, i.e. MageIP. The network should also have some authentication procedure to prohibit communication hijacking. Communication between a mobile device and a base station may be IP-based, but it also may be, for example, Bluetooth-based. Communication between the base station and a network server is IP-based when the communication concerns the IP-packets to be transmitted. In addition, the base station and the network server may have communication that is not IP-based.

The method can be especially utilized when implementing a network system composed of a network server and at least one base station.

The invention claimed is:

1. A method for supporting mobile devices' mobility in wireless networks, each wireless network containing a network server and at least one base station, each base station having a set of care-of addresses, a mobile device having a communication with a correspondent node, wherein the communication is based on transmitting Internet protocol packets, characterized by the steps of:
at a first base station handling the communication;
receiving a packet sent from the mobile device, said packet having a sender address associated therewith;
replacing a home address placed in the packet's sender address with a care-of address currently allocated to the mobile device;
transmitting the packet to the network server;
at the network server,
replacing the care-of address placed in the packet's sender address with the home address, and when the mobile device is located in its home network;
transmitting the packet to the correspondent node;
receiving a response packet as response to the transmitted packet, said response packet having a receiver address associated therewith;
replacing a home address placed in the response packet's receiver address with the care-of address;
transmitting the response packet to the first base station;
at the first base station:
replacing the care-of address placed in the response packet's receiver address with the home address;
transmitting the response packet to the mobile device, thus enabling the communication between the mobile device and the correspondent node;
at a second base station
receiving the mobile device via a handoff;
obtaining a mobile device indentifier from the mobile device;
transmitting the mobile device indentifier to the network server;
at the network server
obtaining a home address of the mobile device having the mobile device indentifier;
allocating a second care-of address to the mobile device;
storing the home address and the second care-of address;
sending the home address and the second care-of address to the second base station; and,
at the second base station,
storing the home address and the second care-of address sent.

2. A method for supporting mobile devices' mobility in wireless networks, wherein a mobile device associated with a home network locates temporarily in a geographical area covered by a foreign network, the home network having a home network server and the foreign network having a foreign network sewer, and wherein the mobile device has a communication with a correspondent node, the communication being based on transmitting Internet protocol packets, characterized by the steps of:
at the foreign network server:
logging in the mobile device's to the foreign network;
at a foreign base station belonging to the foreign network;
receiving a packet sent from the mobile device, said packet having a sender address associated therewith;
replacing a home address placed in the packet's sender address with a care-of address;
transmitting the packet to the foreign network server;
at the foreign network server:
replacing the care-of address placed in the packet's sender address with a visitor address;
transmitting the packet to the mobile device's home network server;
at the home network server:
replacing the visitor address placed in the packet's sender address with the home address;
transmitting the packet to the correspondent node;
receiving a response packet as response to the packet transmitted;
replacing the home address placed in the response packet's receiver address with the visitor address;
transmitting the response packet to the foreign network server;
at the foreign network server:
replacing the visitor address placed in the response packet's receiver address with the care-of address,
transmitting the response packet to the foreign base station;
at the foreign base station:
replacing the care-of address placed in the response packet's receiver address with the home address, and
transmitting the response packet to the mobile device, thus enabling the communication between the mobile device and the correspondent node.

3. The method as defined in claim 2, wherein said step of logging into the foreign network comprises:
at the foreign network server:
obtaining a home address from the mobile device;
allocating the visitor address to the mobile device;
storing the home address and the visitor address;
transmitting the home address and the visitor address to the home network server;
at the home network server:
storing the transmitted home address and the visitor address.

4. The method as defined in claim 2, wherein said step of logging into the foreign network comprises:
at the foreign network server:
obtaining a mobile device identifier from the mobile device;
allocating the visitor address to the mobile device;
transmitting the mobile device identifier and the visitor address to the home network server;
at the home network server:
obtaining a home address of the mobile device having the mobile device identifier;
storing the home address and the visitor address transmitted;
sending the home address to the foreign network server;
at the foreign network server:
storing the home address sent and the visitor address.

5. A system for supporting mobile devices' mobility in wireless networks, the system including at least a network server, and a first base station, the first base station having a set of care-of addresses, wherein a mobile device is adapted to communicate with a correspondent node, the mobile device's communication being based on transmitting Internet protocol packets, characterized in that
the first base station handling said communication is adapted to:

receive a packet sent from the mobile device, said packet having a sender address field associated therewith;
replace a home address placed in the packet's sender address field with a care-of address currently allocated to the mobile device;
transmit the packet to the network server;
the network sewer is adapted to:
replace the care-of address placed in the packet's sender address field with the home address, and when the mobile device is located in its home network;
transmit the packet to the correspondent node;
receive a response packet as response to the packet transmitted, said response packet having a receiver address associated therewith;
replace a home address placed in the response packet's receiver address with the care-of address;
transmit the response packet to the first base station;
the first base station is farther adapted to:
replace the care-of address placed in the response packet's receiver address with the home address;
transmit the response packet to the mobile device, thus enabling the communication between the mobile device and the correspondent node:
a second base station coupled to the system is adapted to
receive the mobile device via a handoff;
obtain a mobile device indentifier from the mobile device;
transmit the mobile device indentifier to the network server;
the network server is further adapted to
obtain a home address of the mobile device having the mobile device identifier;
allocate a second care-of address to the mobile device;
store the home address and the second to the mobile device;
send the home address and the second care-of address to the second base station; and,
the second base station is further adapted to
store the home address and the second care-of address.

6. A system for supporting mobile devices' mobility in wireless networks, wherein a mobile device associated with a home network locates temporarily in a geographical area covered by a foreign network, the home network having a home network server and the foreign network having a foreign network server, and wherein the mobile device is adapted to communicate with a correspondent node, the mobile device's communication being based on transmitting Internet protocol packets,
characterized in that
the foreign network server is adapted to
perform the mobile device's login into the foreign network;
a foreign base station belonging to the foreign network is adapted to:
receive a packet sent from the mobile device, said packet having a sender address associated therewith;
replace a home address placed in the packet's sender address with a care-of address,
transmit the packet to the foreign network server;
the foreign network server is further adapted to:
replace the care-of address placed in the packet's sender address with a visitor address;
transmit the packet to the mobile device's home network server;
the home network server is adapted to:
replace the visitor address placed in the packet's sender address with the home address;
transmit the packet to the correspondent node;
receive a response packet as response to the packet transmitted;
replace the home address placed in the response packet's receiver address with the visitor address;
transmit the response packet to the foreign network server;
the foreign network server is further adapted to:
replace the visitor address placed in the response packet's receiver address with the care-of address;
transmit the response packet to the foreign base station;
the foreign base station is further adapted to:
replace the care-of address placed in the response packet's receiver address with the home address; and,
transmit the response packet to the mobile device, thus enabling the communication between the mobile device and the correspondent node.

7. The system as defined in claim 6, characterized in that to enable the mobile device to login into the foreign network
the foreign network server is further adapted to:
obtain a home address from the mobile device,
allocate the visitor address to the mobile device;
store the home address and the visitor address;
transmit the home address and the visitor address to the home network server; and,
the home network server is further adapted to
store the transmitted home address and the visitor address.

8. The system as defined in claim 6, characterized in that to enable the mobile device to login into the foreign network
the foreign network server is further adapted to:
obtain a mobile device identifier from the mobile device;
allocate the visitor address to the mobile device;
transmit the mobile device identifier and the visitor address to the home network server;
the home network server is further adapted to:
obtain a home address of the mobile device having the mobile device identifier;
store the home address and the visitor address transmitted;
send the home address to the foreign network server;
the foreign network server is further adapted to
store the home address sent and the visitor address.

9. A method for supporting mobile devices' mobility in wireless networks, each wireless network containing a network server and at least one base station, each base station having a set of care-of addresses, a mobile device having a communication with a correspondent node, wherein the communication is based on transmitting Internet protocol packets,
characterized by the steps of:
at a first base station handling the communication
receiving a packet sent from the mobile device, said packet having a sender address associated therewith;
replacing a home address placed in the packet's sender address with a care-of address currently allocated to the mobile device;
transmitting the packet to the network server;
at the network server
replacing the care-of address placed in the packet's sender address with the home address, and when the mobile device is located in its home network;
transmitting the packet to the correspondent node;
receiving a response packet as response to the transmitted packet, said response packet having a receiver address associated therewith;

replacing a home address placed in the response packet's receiver address with the care-of address;
transmitting the response packet to the first base station;
at the first base station
replacing the care-of address placed in the response packet's receiver address with the home address;
transmitting the response packet to the mobile device, thus enabling the communication between the mobile device and the correspondent node;
at a second base station
receiving the mobile device via a handoff
obtaining the home address from the mobile device;
allocating a second care-of address to the mobile device;
storing the home address and the second care-of address;
transmitting the home address and the second care-of address to the network server;
at the network server
storing the home address and the second care-of address sent;
transmitting the home address to the first base station in which area the mobile device was located before the handoff; and,
at the first base station
removing a record related to the home address.

10. A system for supporting mobile devices' mobility in wireless networks, the system including at least a network server, and a first base station, the first base station having a set of care-of addresses, wherein a mobile device is adapted to communicate with a correspondent node, the mobile device's communication being based on transmitting Internet protocol packets,
characterized in that
the first base station handling said communication is adapted to receive a packet sent from the mobile device, said packet having a sender address field associated therewith;
replace a home address placed in the packet's sender address field with a care-of address currently allocated to the mobile device;
transmit the packet to the network server;
the network server is adapted to
replace the care-of address placed in the packet's sender address field with the home address, and when the mobile device is located in its home network;
transmit the packet to the correspondent node;
receive a response packet as response to the packet transmitted, said response packet having a receiver address associated therewith;
replace a home address placed in the response packet's receiver address with the care-of address;
transmit the response packet to the first base station;
the first base station is further adapted to
replace the care-of address placed in the response packet's receiver address with the home address;
transmit the response packet to the mobile device, thus enabling the communication between the mobile device and the correspondent node;
a second base station coupled to the system is adapted to
receive the mobile device via a handoff;
obtain the home address from the mobile device;
allocate a second care-of address to the mobile device;
transmit the home address and the second care-of address to the network server;
the network server is further adapted to
store the home address and the second care-of address;
the network server is further adapted to
transmit the home address to the first base station in which area the mobile device was located before the handoff; and,
the first base station is further adapted to
remove a record related to the home address.

11. A system for supporting mobile devices' mobility in wireless networks, the system including at least a network server, and a first base station, the first base station having a set of care-of addresses, wherein a mobile device is adapted to communicate with a correspondent node, the mobile device's communication being based on transmitting Internet protocol packets,
characterized in that
the first base station handling said communication is adapted to
receive a packet sent from the mobile device, said packet having a sender address field associated therewith;
replace a home address placed in the packet's sender address field with a care-of address currently allocated to the mobile device;
transmit the packet to the network server;
the network server is adapted to
replace the care-of address placed in the packet's sender address field with the home address, and when the mobile device is located in its home network;
transmit the packet to the correspondent node;
receive a response packet as response to the packet transmitted, said response packet having a receiver address associated therewith;
replace a home address placed in the response packet's receiver address with the care-of address;
transmit the response packet to the first base station;
the first base station is further adapted to
replace the care-of address placed in the response packet's receiver address with the home address; and,
transmit the response packet to the mobile device, thus enabling the communication between the mobile device and the correspondent node;
a second base station coupled to the system is adapted to
receive the mobile device via a handoff;
obtain the home address from the mobile device;
transmit the home address to the network server;
the network server is further adapted to
allocate a second care-of address to the mobile device;
store the home address and the second care-of address;
send the second care-of address to the second base station;
the second base station is further adapted to
store the home address and the second care-of address sent;
the network server is further adapted to
transmit the home address to the first base station in which area the mobile device was located before the handoff and,
the first base station is further adapted to
remove a record related to the home address.

12. A system for supporting mobile devices' mobility in wireless networks, the system including at least a network server, and a first base station, the first base station having a set of care-of addresses, wherein a mobile device is adapted to communicate with a correspondent node, the mobile device's communication being based on transmitting Internet protocol packets,
characterized in that
the first base station handling said communication is adapted to receive a packet sent from the mobile device, said packet having a sender address field associated therewith;

replace a home address placed in the packet's sender address field with a care-of address currently allocated to the mobile device;

transmit the packet to the network server;

the network server is adapted to replace the care-of address placed in the packet's sender address field with the home address, and when the mobile device is located in its home network;

transmit the packet to the correspondent node;

receive a response packet as response to the packet transmitted, said response packet having a receiver address associated therewith;

replace a home address placed in the response packet's receiver address with the care-of address;

transmit the response packet to the first base station;

the first base station is further adapted to replace the care-of address placed in the response packet's receiver address with the home address;

transmit the response packet to the mobile device, thus enabling the communication between the mobile device and the correspondent node;

a second base station coupled to the system is adapted to receive the mobile device via a handoff; obtain a mobile device identifier from the mobile device; allocate a second care-of address to the mobile device; transmit the mobile device identifier and the second care-of address to the network server;

the network server is further adapted to obtain a home address of the mobile device having the mobile device identifier;

store the home address and the second care-of address;

send the home address to the second base station;

the second base station is further adapted to store the home address sent and the second care-of address;

the network server is further adapted to transmit the home address to the first base station in which area the mobile device was located before the handoff and, the first base station is further adapted to remove a record related to the home address.

* * * * *